Reissued Oct. 10, 1922. Re. 15,466

UNITED STATES PATENT OFFICE.

THOMAS E. MURRAY, JR., OF BROOKLYN, NEW YORK.

METHOD OF ELECTRIC WELDING.

No Drawing. Original Nos. 1,281,636 and 1,281,637, dated October 15, 1918, Serial Nos. 215,710 and 215,711, filed February 6, 1918. Application for reissue filed January 16, 1922. Serial No. 529,783.

*To all whom it may concern:*

Be it known that I, THOMAS E. MURRAY, Jr., a citizen of the United States, residing at Brooklyn, New York, have invented a certain new and useful Improvement in Methods of Electric Welding, of which the following is a specification.

The invention is an improvement in the art of electric welding, whereby a weld can be secured of a strength equal to that of the metal welded, and a single, integral homegeneous body may be formed, and this can be done continuously over a contact area of considerable extent with great uniformity and great economy of time and labor.

As commonly practised, electric welding is a sticking together of the opposing bodies by rendering their surfaces plastic or pasty and pressing them into more or less close contact. The result is attraction between the molecules at the surfaces of the respective bodies, caused first by rendering said molecules mobile by heat, and then moving them by the pressure into closer proximity and so into their fields of mutual attraction. In old physical nomenclature, the surfaces are then said to "adhere."

While temperature of a degree sufficient to make the opposing surfaces adhesive will effect a union, the strength of said union is a matter of wide variation. In fact the strength of any particular joint cannot be known except by testing that particular joint to destruction; nor from the tests of one joint can the strength of other joints certainly be inferred. A given joint may be amply strong to meet conditions involving small strain, as, for example, the uniting of electrical line conductors or the parts of utensils or light structures, but it may be wholly inadequate to withstand the demands of heavy loads or shocks or of moving machinery.

The effort to make stronger joints has led to moderately increasing current strength, or both current strength and current duration, for the purpose of obtaining greater plasticity or fluidity of the metal; but this leads primarily to burning of the metal. Increase of pressure leads to greater extrusion of metal at the joint which is intensified when the fluidity or plasticity of the metal is augmented. The result is then merely surface adhesion, as before, over a larger area. To increase the duration of the current deteriorates the physical condition of the metal itself.

Another cause of uncertainty and unreliability of the welded joint is the great difficulty, and often practical impossibility, of insuring a uniform current flow per unit area of welding surface. If other materials are present in the metal, especially substances of lower conductibilty, the current will cause unequal heating of the surface, with a result that one part may be burned before a proper plastic condition is produced elsewhere. So also if the surfaces exhibit protuberances which may contact before the more depressed portions, the current may burn off the protuberances before the last-named portions are suitably heated, or even if the opposed surfaces are not rigorously parallel, the current will become concentrated and so affect the portions of said surfaces which first make contact. Increasing the current to obtain greater plasticity, or continuing it for longer periods, or using greater mechanical pressure does not overcome these difficulties.

I have discovered after much study and research, that I can produce an electrically welded union possessing a strength as great as that of an integral mass of the same material of like cross-sectional area by subjecting the bodies to be welded to an electric current of extremely and abnormally high ampere strength existing for a very brief period of time.

When the area is small, say about five square inches or under, I prefer to use currents of about one hundred thousand amperes to the square inch. When the area is large, say about twenty square inches or above, I prefer to use currents of about fifty thousand amperes to the square inch. When the area is between five and twenty square inches, I prefer to use currents between one hundred thousand and fifty thousand amperes to the square inch. When the current density is about one hundred thousand amperes per square inch, the duration of the weld is approximately one-quarter of a second. When the current density is about fifty thousand amperes the duration of the welding operation is between two and three seconds.

Thus I am actually welding with abnormally strong currents steel bodies which have an area of contact of over twenty square inches in less than three seconds. I am actually welding two pieces of steel having an area of five square inches in less than one-half a second; two pieces of steel having a thickness of .109 inches and a length of eighty-five inches in less than two seconds; two pieces of steel having a thickness of one-sixteenth of an inch and a total length of three hundred and fifty inches in less than three seconds. In each of these cases I am using a current of extremely and abnormally high ampere strength existing for a very brief period of time.

I am not aware of any instance in the prior art where such currents have been used in any electric welding operation, or that any knowledge exists as to their properties, as herein set forth.

The operation is so rapid that it is impossible to be certain of the stages through which the work passes. I can state with certainty only the methods used and the results achieved. My theory is as follows:

The weld is not caused by surface molecular attraction or "adhesion", but by a complete dissociation of the molecules for a certain distance inward from the surface of each body, followed by the intermingling of the molecules of one body with those of the other, and their mutual attraction developed within the momentarily gaseous film, so that the said molecules become united throughout the mass. Under the old physical nomenclature, they "cohere". If the two bodies are of the same material, then after welding there is no solution of continuity, and the two bodies simply become integrally one body. If the two bodies are of different materials, then while there is still no solution of continuity, a portion of the welded mass is composite and partakes of the nature of both bodies; that is to say, if, for example, copper and zinc be the materials, a portion of the welded mass will be an alloy or mixture of the two metals.

The enormously high temperature developed, gasifies the metal or metals of the bodies instantly, and in the brief time period permits the molecules to intermingle and cohere. With such ampere strengths there is no time for any burning of the metal or for the conduction of heat away through the mass before the gasification of the metal and the intermingling of molecules occurs. Of course, the temperature is far above that which would permit the metal to become plastic or pasty. Because there is complete cohesion of the molecules within the mass the physical condition of the metal is the same at the place of union as anywhere else. Therefore the same strength everywhere follows as a necessary consequence. This can be accomplished in no other way, so far as I know.

When currents of such extreme ampere strength are used, as before noted, all the difficulties incident to surface irregularities, lack of parallelism and difference of conductibility of different portions disappear, and naturally so since the intermingling produced is of gases in which the molecules are free and comparatively widely separated. So also there appears to be no limitation of surface areas which can be united. With a suitably strong momentary current it is as easy to weld areas of say twenty square inches as areas of one square inch.

Another advantageous result attending my use of enormously strong current is the neutralization of the difficulties due to radiation from the heated bodies to the holding electrodes when the area of contact between said bodies and said electrodes is largely increased. To take a simple illustration: Assume that two bars measuring in cross sectional area one square inch are to be united. The best conditions are attained when each bar is inclosed in a copper electrode in contact with all four sides. If each electrode is one inch in width, then the contact area of each electrode with its bar is four square inches. As already pointed out, I can butt-weld these bars by my process and be certain that the strength at the union will be equal to that of the integral metal. Suppose, however, while keeping the area the same, the form of that area be changed, as, to illustrate, let the surface area instead of one square inch in the shape of a square be changed to one square inch in the form of a rectangle of 0.5x2 inches. The contact area or radiation surface of the copper electrode holders will then be five inches instead of four inches, or twenty per cent greater. This is increased radiation surface of the bar, and, therefore, the heat developed will escape to the electrode more rapidly than before. This loss is, as I have stated, easily counteracted by an increase in the ampere strength of the current.

If a current of given high ampere strength will produce a perfect union when the contact area is a square or other regular figure of uniform dimensions, the same result may be obtained when the figure is changed to one in which the dimensions widely differ by increasing the current strength. All that is necessary for a given shape is to go on increasing the current strength until the perfect union is produced. After that, with unchanged conditions as to shape, material, etc., the welding of like bodies may be repeated indefinitely.

Practical applications to the invention to these long narrow joints are indicated in specific cases referred to above.

It is unnecessary in carrying out my process to use a high voltage. I have made good welds using about eight volts on the secondary of a transformer.

This invention is to be distinguished from the method known as "percussive" welding and from similar processes in which, by means of an uncontrolled condenser discharge a considerable current is passed in an instant through small points or spots of contact such as the ends of wires or rods or the so-called "spot welding" in which considerable areas are in contact but the welding is effected at separated points in the contact area. My invention is useful in welding considerable areas of contact and making a continuous weld over such areas by passing the current through substantially the entire area of the contact, the current being proportioned to such area. Examples of the considerable areas to which my invention is applied in this way are recited above. Also my process is distinguished in that it uses a steady current (that is, of steady amperage) throughout the period of application, the amperage at the end of the period being nearly equal to the average. In the percussive methods referred to, the condenser discharge produces a high voltage and a comparatively low amperage which tapers off gradually to zero. And where the time interval is practically uncontrolled in the said methods, with my method it varies inversely or in the opposite direction from the variation in current density, as indicated in the examples given above.

Though I have described with great particularity of detail certain embodiments of my invention yet it is not to be understood therefrom that the invention is restricted to the particular embodiments described. Various modifications thereof may be made by those skilled in the art without departure from the invention as defined in the following claims.

What I claim is—

1. The improvement in the art of electric welding, which consists in subjecting the bodies to be united to a current of extremely high ampere strength and of very brief duration, whereby said bodies are caused to form a single homogeneous body without solution of continuity.

2. The improvement in the art of electric welding, which consists in subjecting the bodies to be united to a current of extremely high ampere strength and of very brief duration, and thereby producing molecular dissociation at each of the opposing faces of said bodies and an intermingling of the dissociated molecules, whereby said bodies are caused to form a single homogeneous body without solution of continuity.

3. The improvement in the art of electric welding, which consists in subjecting two bodies of respectively different metals to a current of extremely high ampere strength and very brief duration, and thereby producing molecular dissociation at each of the opposing faces of said bodies and an intermingling of the dissociated molecules, whereby said bodies are caused to form an integral body without solution of continuity, a part of said body being composed of a mixture of alloy of the materials of two original bodies.

4. The improvement in the art of electric welding, which consists in subjecting the bodies to be united to a current of extremely high ampere strength applied for a very brief predetermined and regulated period of time as distinguished from a sudden uncontrolled discharge.

5. The improvement in the art of electric welding, which consists in subjecting two bodies of respectively different metals to a current of extremely high ampere strength applied for a very brief predetermined and regulated period of time (as distinguished from a sudden and uncontrolled discharge).

6. The improvement in the art of electric welding, which consists in bringing into contact and under pressure considerable surfaces of the bodies to be united, the area of the contact surfaces having a length substantially greater than its width, and passing through substantially the entire surface in contact a current of extremely high ampere strength per unit of area of the contact surfaces and of very brief duration.

7. The improvement in the art of electric welding, which consists in bringing into contact and under pressure considerable surfaces of the bodies to be united, the area of the contact surfaces having a length substantially greater than its width, and passing through such bodies a current of extremely high ampere strength per unit of area of the contact surfaces and of very brief duration, the said ampere strength being greater than the ampere strength necessary to accomplish the same result in welding two bodies of identical material whereof the length of the contact area is equal to the width thereof.

8. The method of electrically welding bodies whereof the contact area is one in which the length is greater than the width, which consists in subjecting said bodies to a current of extremely high ampere strength and very brief duration to cause said bodies to form a single homogeneous body without solution of continuity, and of a strength equal to that of an unwelded body of like material and dimensions, the said ampere strength being greater than the ampere strength necessary to accomplish the same result in welding two bodies of identical material whereof the length of the contact area is equal to the width thereof.

9. The improvement in the art of electric welding, which consists in bringing into contact and under pressure considerable areas of the bodies to be united and passing through substantially the entire area in contact a current of extremely high ampere strength per unit of area of the contact surfaces and of very brief duration.

10. The improvement in the art of electric welding, which consists in subjecting the bodies to be united to a current of extremely high ampere strength and of very brief duration, maintaining the high amperage throughout the period of application of the current.

11. The improvement in the art of electric welding which consists in bringing into contact and under pressure considerable areas of two bodies of respectively different metals and passing through substantially the entire areas in contact a current of extremely high ampere strength per unit of area of the contact surfaces and of very brief duration.

12. The improvement in the art of electric welding, which consists in subjecting the bodies to be united to a current of extremely high ampere strength in proportion to the contact area and of a very brief duration varying in an inverse proportion to the current density maintaining the high amperage throughout the period of application of the current.

13. The process of uniting two pieces of metal which consists in bringing said pieces into contact under pressure and passing through them a current of extremely high ampere strength predetermined and regulated in proportion to the area and the shape of the contacting surfaces and of very brief duration predetermined and regulated according to the current density (as distinguished from a sudden uncontrolled discharge).

In witness whereof, I have hereunto signed my name.

THOMAS E. MURRAY, Jr.